US012120808B2

(12) United States Patent
Nettesheim et al.

(10) Patent No.: US 12,120,808 B2

(45) Date of Patent: Oct. 15, 2024

(54) APPARATUS FOR GENERATING A GAS DISCHARGE

(71) Applicant: TDK Electronics AG, Munich (DE)

(72) Inventors: Stefan Nettesheim, Regensburg (DE); Klaus Forster, Bad Abbach (DE)

(73) Assignee: TDK Electronics AG, Munich (DE)

( * ) Notice: Subject to any disclaimer, the term of this patent is extended or adjusted under 35 U.S.C. 154(b) by 335 days.

(21) Appl. No.: 17/634,518

(22) PCT Filed: Aug. 13, 2020

(86) PCT No.: PCT/EP2020/072762

§ 371 (c)(1),
(2) Date: Feb. 10, 2022

(87) PCT Pub. No.: WO2021/037576

PCT Pub. Date: Mar. 4, 2021

(65) Prior Publication Data

US 2022/0338338 A1 Oct. 20, 2022

(30) Foreign Application Priority Data

Aug. 27, 2019 (DE) ......................... 102019122930.8

(51) Int. Cl.
*H05H 1/24* (2006.01)

(52) U.S. Cl.
CPC ........ *H05H 1/2481* (2021.05); *H05H 1/2406* (2013.01)

(58) Field of Classification Search
None
See application file for complete search history.

(56) References Cited

U.S. PATENT DOCUMENTS

| | | | | |
|---|---|---|---|---|
| 6,958,063 | B1 * | 10/2005 | Soll | A61B 18/042 606/49 |
| 2007/0159762 | A1 | 7/2007 | Okano | |
| 2010/0292757 | A1 | 11/2010 | Ehlbeck et al. | |
| 2012/0276499 | A1 | 11/2012 | Devery et al. | |
| 2015/0373824 | A1 | 12/2015 | Nettesheim et al. | |
| 2016/0030760 | A1 | 2/2016 | Srb et al. | |

(Continued)

FOREIGN PATENT DOCUMENTS

| | | |
|---|---|---|
| CN | 102771193 A | 11/2012 |
| CN | 104981269 A | 10/2015 |

(Continued)

*Primary Examiner* — Ashok Patel

(74) *Attorney, Agent, or Firm* — Slater Matsil, LLP

(57) ABSTRACT

In an embodiment a device includes a low voltage assembly having an output contact, the low voltage assembly configured to provide a low voltage at the output contact, a high voltage assembly having an input contact and a transformer and a plug-in connection interconnecting the low voltage assembly and the high voltage assembly, wherein the plug-in connection is configured to provide an electrical contact between the output contact of the low voltage assembly and the input contact of the high voltage assembly, wherein the low voltage provided at the output contact is applied to the transformer via the input contact, wherein the transformer is configured to convert the low voltage into a high voltage, and wherein the device is configured to generate a gas discharge.

19 Claims, 4 Drawing Sheets

(56) References Cited

U.S. PATENT DOCUMENTS

| | | | |
|---|---|---|---|
| 2016/0193475 A1 | 7/2016 | Srb et al. | |
| 2016/0338814 A1 | 11/2016 | Cho et al. | |
| 2017/0303381 A1 | 10/2017 | Wang | |
| 2018/0126183 A1 | 5/2018 | Nijdam et al. | |
| 2018/0133496 A1 | 5/2018 | Zuidervaart et al. | |
| 2019/0098739 A1 | 3/2019 | Weilguni et al. | |
| 2019/0327823 A1 | 10/2019 | Hahnl et al. | |
| 2020/0077503 A1 | 3/2020 | Pichler et al. | |
| 2020/0137865 A1 | 4/2020 | Pichler et al. | |
| 2020/0361772 A1* | 11/2020 | Hall .................. | H01J 37/32146 |
| 2021/0076813 A1 | 3/2021 | Wandke et al. | |

FOREIGN PATENT DOCUMENTS

| | | | |
|---|---|---|---|
| CN | 107432077 | A | 12/2017 |
| CN | 107690316 | A | 2/2018 |
| CN | 109071225 | A | 12/2018 |
| DE | 102007046396 | A1 | 4/2009 |
| DE | 102007037406 | A1 | 6/2009 |
| DE | 102009015510 | B4 | 9/2012 |
| DE | 102012025082 | B3 | 1/2014 |
| DE | 102012025079 | A1 | 3/2014 |
| DE | 102013100617 | B4 | 8/2016 |
| DE | 102015101391 | B4 | 10/2016 |
| DE | 202018101625 | U1 | 5/2018 |
| DE | 212018000015 | U1 | 10/2018 |
| DE | 102017120902 | A1 | 3/2019 |
| EP | 2141968 | B1 | 7/2016 |
| JP | 2015533529 | A | 11/2015 |
| JP | 2018504202 | A | 2/2018 |
| WO | 2016192986 | A1 | 12/2016 |
| WO | 2017162505 | A1 | 9/2017 |
| WO | 2018127257 | A1 | 7/2018 |
| WO | 2018167156 | A1 | 9/2018 |
| WO | 2018167167 | A1 | 9/2018 |

* cited by examiner

APPARATUS FOR GENERATING A GAS DISCHARGE

This patent application is a national phase filing under section 371 of PCT/EP2020/072762, filed Aug. 13, 2020, which claims the priority of German patent application 102019122930.8, filed Aug. 27, 2019, each of which is incorporated herein by reference in its entirety.

TECHNICAL FIELD

The present invention relates to a device for generating a gas discharge, for example a non-thermal atmospheric pressure plasma.

BACKGROUND

The requirements for a high voltage supply capable of igniting a discharge in a gas at atmospheric pressure are high.

The high voltage supply is subjected to not inconsiderable mechanical stresses caused by the plasma ignitions themselves as well as by chemical processes generated during plasma ignition. The high voltage supply should be robust against these stresses.

The high voltage supply should have low impedance to avoid high reactive power. The cables used in such a system must therefore be well insulated and must not be subjected to excessive mechanical stress. The connection capacity of a discharge path is considerably increased by the cable capacity.

SUMMARY OF THE INVENTION

Embodiments provide an improved device for generating a gas discharge. The device should preferably have a compact design and be robust against environmental influences and stresses caused by the gas discharge.

A device for generating a gas discharge, for example a non-thermal atmospheric pressure plasma, is proposed, comprising a low voltage assembly and a high voltage assembly. The low voltage assembly has an output contact, wherein the low voltage assembly is configured to provide a low voltage at the output contact. The high voltage assembly includes an input contact and a transformer. The low voltage assembly and the high voltage assembly are interconnected by a plug-in connector, wherein the plug-in connector forms an electrical contact between the output contact of the low voltage assembly and the input contact of the high voltage assembly, wherein the low voltage provided at the output contact is applied to the transformer via the input contact, and wherein the transformer is adapted to convert the low voltage to a high voltage.

Accordingly, the low voltage assembly and the high voltage assembly may be constructionally separated into two sub-units of the device. This allows the components to which a high voltage may be applied to be separated from the remaining components of the device.

The high voltage assembly may be designed to provide particularly good protection against environmental influences such as dust or moisture. The high voltage assembly may also provide shielding for the components arranged therein, in particular for the transformer. Since there is no high voltage in the low voltage assembly, the requirements for shielding and/or protection against environmental influences in the low voltage assembly may be lower. By constructionally separating the low voltage assembly and the high voltage assembly, a device can be constructed in which the entire device does not have to meet the high requirements concerning environmental influences or in which the entire device does not have to be shielded, but in which it is sufficient to protect the high voltage assembly particularly well against environmental influences or to shield the high voltage assembly. This allows a compact design of the device.

Since the low voltage assembly and the high voltage assembly are connected to each other by the plug-in connector, the low voltage assembly and the high voltage assembly can be separated from each other by disconnecting the plug-in connector. Accordingly, one of the assemblies can be replaced and the other assembly can continue to be used. In particular, the transformer may be subjected to stresses during gas discharge that limit the life time of the transformer. In the device, the high voltage assembly can be disconnected and replaced by unplugging the plug-in connector so that the assembly having the structure with the lowest life time, namely the discharge structure in unity with the transformer, can be easily replaced.

A low voltage assembly may be defined as an assembly in which only a low voltage is present. For example, low voltage may be defined as any voltage up to 1000 V. A high voltage assembly may be defined as an assembly having the components configured to convert the low voltage to a high voltage. High voltage may be defined as, for example, as any voltage greater than 1000 V.

The device may be, for example, a handheld device. The handheld device may, for example, be intended for use in medical applications. The device may be a module for 3D printing, a module for digital printing, or a module for textile treatment facilities.

The low voltage module may include a housing, and the high voltage module may include a cartridge in which the transformer is arranged and which comprises the input contact. The housing and the cartridge may be latched or clamped together by the plug-in connector.

The cartridge may be a container suitable for insertion into the housing. The cartridge may be encapsulated, i.e., sealed. Alternatively, the cartridge may have an opening.

The cartridge may have a simple and robust construction. A volume enclosed by the cartridge may be smaller than a volume enclosed by the housing. The cartridge may have a small design to ensure that there are short lengths of cable in the high voltage assembly that do not significantly increase an impedance of the high voltage assembly. Thus, a device with a low reactive power can be designed.

Both a plug-in connection configured as a latching connection and a plug-in connection configured as a clamping connection can protect against accidental disconnection of the respective connection. The latching connection may define a force threshold, where a force greater than the force threshold must be applied to disconnect the plug-in connection.

The high voltage assembly may include a discharge structure configured to affect an electric field generated by the high voltage generated at the transformer.

The discharge structure may include conductive structures, such as a metallization, for this purpose, which alter the field routing of the field generated by the transformer. The metallization may be disposed on an outer surface of the cartridge. The discharge structure may be arranged on the cartridge such that it is close to the transformer. This allows the discharge structure to be coupled to the transformer with minimal impedance.

The discharge structure may include a protruding element disposed on the exterior of the cartridge, the protruding element being made of a conductive material. The protruding element may be needle-shaped or blade-shaped. Accordingly, it may be tapered and provide a point-like field elevation at a tip. This may cause a point-like gas discharge, for example a point-like plasma ignition. Alternatively, the protruding element may be rounded at its tip. As a result, a gas discharge, for example a plasma ignition, can be triggered on a small area of the protruding element. Alternatively, the protruding element may have a wire at an end facing away from the transformer that is perpendicular to a longitudinal direction of the cartridge. Such a protruding element may initiate gas discharges, such as plasma ignitions, on a near-linear structure. Accordingly, different discharge structures are possible, resulting in gas discharges with different shapes. Depending on the intended use of the device, the appropriate discharge structure can be selected.

In a further embodiment, the protruding element comprises bristles, wherein at least some of the bristles comprise a conductive material and/or at least some of the bristles comprise an insulating material. The bristles made of the conductive material may provide a point-like gas discharge, such as a point-like plasma ignition. Thus, the discharge structure can initiate a plurality of point-like gas discharges simultaneously. The bristles of the insulating material can mechanically treat a surface and/or act as spacers that prevent the bristles of the conductive material from coming into direct contact with the surface.

The discharge structure may be coated with an insulating material that forms a dielectric barrier. Accordingly, gas discharges, such as plasma ignitions, may be caused by dielectric barrier discharges.

The transformer may be encapsulated within the cartridge. In this regard, the cartridge may be sealed. Encapsulation may provide good protection against dirt, moisture and corrosion. The encapsulation can provide shielding of the transformer from interfering electric fields. The encapsulation in the cartridge can prevent unwanted plasma ignitions, for example at longitudinal edges of a piezoelectric transformer, or flashovers to the high voltage winding of a conventional transformer.

In this regard, the cartridge may be configured to allow the discharge structure and input contacts to exchange energy with the environment or the low voltage structure, and otherwise isolate the high voltage assembly from the environment.

The cartridge may include an opening, such as a plasma exit opening. For some applications of the device, it may be advantageous for the gas discharge to be generated directly at an end face of the transformer and to exit from the opening.

The high voltage assembly may be separable from the low voltage assembly. As discussed above, this may allow replacement of a defective high voltage assembly. Further, a high voltage assembly may be replaced by another high voltage assembly having a different discharge structure. This allows a single low voltage assembly to effect gas discharges in different forms.

The low voltage assembly may include a driver module to drive the transformer.

The transformer may be a piezoelectric transformer. A piezoelectric transformer has a compact design and may thereby enable a construction of a small and compact cartridge. The piezoelectric transformer may be a Rosen-type transformer.

The high voltage assembly may include a gas supply line through which a process gas may be supplied. The process gas may be, for example, air or a noble gas, such as argon. The process gas may be directed through the gas supply to a location in close proximity to the location of the gas discharge, for example, the plasma ignition. The process gas may be ionized during the gas discharge.

The device may be, for example, a plasma generator, an ionizer, an ozone generator, and/or a gas discharge structure.

Another aspect relates to an arrangement comprising the device described above and a further high voltage assembly. The low voltage assembly of the device is thereby configured to be interchangeably connected to one of the high voltage assembly of the device and the further high voltage assembly. The two high voltage assemblies may differ in their discharge structure. Accordingly, the two high voltage assemblies may be configured to cause gas discharges in different forms, such as point-like or planar. Alternatively or additionally, the two high voltage assemblies may be configured to cause gas discharges, for example plasma ignitions, in different ways, for example by corona discharge or dielectric barrier discharge. The device is thus variable in use, since a single low voltage assembly can be used to effect gas discharges, for example plasma ignitions, in different forms and in different ways by the possibility of combining it with different high voltage assemblies. The high voltage assemblies may be in a set that includes several cartridges that are different from each other. Such a set may be provided together with the low voltage assembly as a multifunctional kit.

BRIEF DESCRIPTION OF THE DRAWINGS

Preferred embodiments are described below with reference to the figures.

DETAILED DESCRIPTION OF ILLUSTRATIVE EMBODIMENTS

Figure 1:
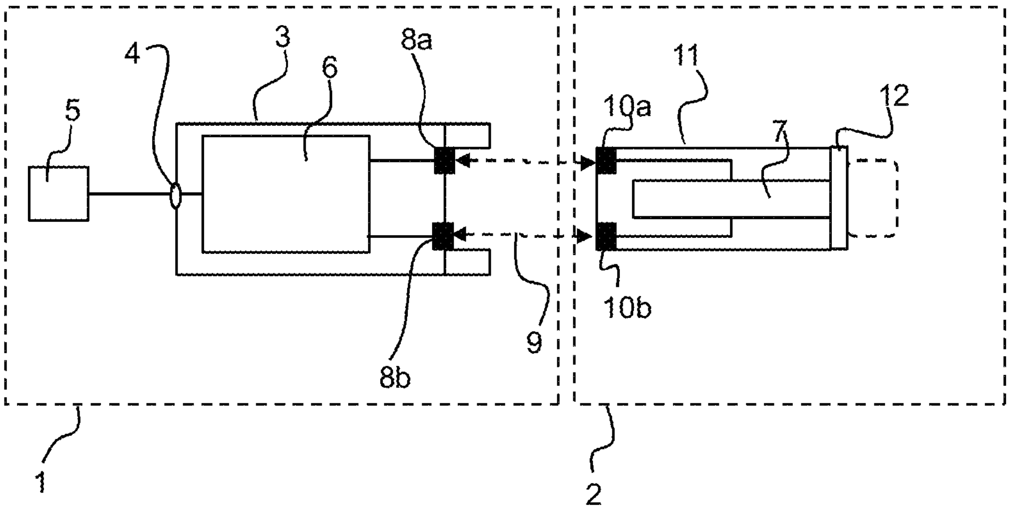
FIG. 1 schematically shows a device for generating a gas discharge.

FIG. 1 schematically shows a device for generating a gas discharge. The device has a low voltage assembly 1 and a high voltage assembly 2.

Only a low voltage is present in the low voltage assembly 1. The low voltage assembly 1 has a housing 3. All elements of the low voltage assembly may be arranged in the housing 3. In the embodiment shown in FIG. 1, the low voltage assembly 1 has a connection 4 for a mains supply 5. The low voltage assembly 1 is connected to the mains supply 5 via the connection 4. The connection 4 for the mains supply 5 is formed in the housing 3. Alternatively, the low voltage assembly 1 may also have a battery or a rechargeable battery, which are used as a voltage source. In this case, the rechargeable battery or the battery may be arranged in the housing 3.

A driver module 6 is arranged in the housing 3. The driver module 6 may be, for example, an ASIC (Application Specific Integrated Circuit) or a printed circuit board on which a drive circuit is formed. The driver module 6 is designed to drive a transformer 7 in the high voltage assembly. In this context, the drive can have a resonance control, a phase control, an amplitude control, a power control, a pulse width modulation or a pulse operation. Likewise, it is possible to monitor the operating state on the high voltage side via the high-frequency signal components generated during discharge ignition.

The low voltage assembly 1 further has two output contacts 8*a*, 8*b*. A low voltage can be provided at the output contacts 8*a*, 8*b*. In particular, the output contacts 8*a*, 8*b* are connected to the mains supply 5 via the driver module 6. The driver module 6 can thereby pass on the voltage provided by the mains supply 5 to the output contacts 8*a*, 8*b*.

The housing 3 of the low voltage module 11 has a plug-in connection 9 shown schematically in FIG. 1. The plug-in connection 9 enables the low voltage assembly 1 to be mechanically connected to the high voltage assembly 2. When the plug-in connection 9 is closed, an electrical contact is closed between the output contacts 8*a*, 8*b* of the low voltage assembly 1 and input contacts 10*a*, 10*b* of the high voltage assembly 2. The voltage provided at the output contacts 8*a*, 8*b* of the low voltage assembly 1 can be transmitted to the high voltage assembly 2 when the plug-in connection 9 is closed.

In particular, the plug-in connection 9 can be designed such that the low voltage assembly 1 and the high voltage assembly 2 latch together. Alternatively, the low voltage assembly 1 and the high voltage assembly 2 may be clamped together when the plug-in connection 9 is closed. The plug-in connection 9 is designed in such a way that the high voltage assembly 2 rests directly against the housing 3 of the low voltage assembly 1 when the plug-in connection 9 is closed.

In the embodiment schematically shown in FIG. 1, the housing 3 of the low voltage assembly 1 forms a female connection partner of the plug-in connection 9 and the high voltage assembly 2 forms a male connection partner of the plug-in connection 9. In an alternative embodiment, the low voltage assembly 1 may form the male connection partner of the plug-in connection 9 and the high voltage assembly 2 may form the female connection partner of the plug-in connection 9.

The plug-in connection 9 is designed in such a way that a force threshold must be overcome in order to open the plug-in connection. This can prevent accidental disconnection of the plug-in connection 9. Alternatively or additionally, the plug-in connection 9 can be designed in such a way that a defined movement of the connection partners must be carried out. The plug-in connection 9 can, for example, be designed as a bayonet connection. In this case, the high voltage assembly 2 can only be disconnected from the low voltage assembly 1 if a rotating movement of the high voltage assembly 2, in which the high voltage assembly 2 is rotated relative to the low voltage assembly 1, followed by a pulling movement, in which the high voltage assembly 2 is moved linearly with respect to the low voltage assembly 1, is performed.

The high voltage assembly 2 has the aforementioned input contacts 10*a*, 10*b*. Furthermore, the high voltage assembly 2 has the transformer 7. The input contacts 10*a*, 10*b* are connected to the transformer 7. The transformer 7 is configured to convert a low voltage applied thereto into a high voltage. The high voltage generated by the transformer 7 is used for gas discharge, for example for plasma generation. The transformer 7 may be a piezoelectric transformer, for example.

The high voltage assembly may include a cartridge 11. The transformer 7 is arranged in the cartridge 11. The cartridge 11 has input contacts 10*a*, 10*b*. Thereby, the input contacts 10*a*, 10*b* are arranged on an outer side of the cartridge 11. The cartridge 11 is adapted to be plugged into the low voltage assembly 1.

The cartridge 11 further includes a discharge structure 12. When a high voltage is generated at the piezoelectric transformer 7, the discharge structure 12 influences the electric field generated, and in this way the shape of a generated gas discharge or plasma discharge is determined in advance. Various discharge structures 12 will be discussed later with reference to FIGS. 3 to 13. Depending on the discharge structure 12 used, the high voltage assembly 2 may be configured to ignite plasma by a dielectric barrier discharge or by a corona discharge. The discharge structure 12 is located at the end of the cartridge 11 facing away from the input contacts 10*a*, 10*b*.

The plug-in connection 9 can be designed in such a way that plugging the high voltage assembly 2 into the low voltage assembly 1 is only possible in one orientation. Alternatively, plugging-in in both orientations may be possible. Accordingly, for example, the output contact 8*a* can be connected to either of the two input contacts 10*a*, 10*b*.

The plug-in connection 9 makes it possible to define a defined state in which the low voltage assembly 1 and the high voltage assembly 2 are firmly connected and can only be separated from each other by applying a force that is greater than the defined force threshold, so that unintentional separation of the two assemblies 1, 2 can be avoided. The plug-in connection 9 can further provide an electrically secure connection between the two assemblies 1, 2.

The transformer 7 is encapsulated in the high voltage assembly 2 in the cartridge 11. As a result, the transformer 7 is protected against dust, moisture and corrosion. Furthermore, the cartridge 11 provides shielding of the high voltage components, in particular the transformer 7, thus preventing unwanted parasitic discharges.

The high voltage assembly 2 can be separated from the low voltage assembly 1 by disconnecting the plug-in connection 9. Depending on the design of the plug-in connection 9, this may require a force threshold to be overcome or a defined movement, for example a linked rotating and pulling movement. The high voltage assembly 2 can then be replaced by another high voltage assembly which is connected to the low voltage assembly 1. The other high voltage assembly may differ from the first high voltage assembly 2, for example, by the discharge structure 12. Accordingly, a single low voltage assembly 1 may be used to generate different types of gas discharges by respectively connecting other high voltage assemblies 2 having different discharge structures 12 to the low voltage assembly 1.

The piezoelectric transformer 7 is a mechanically vibrating component and should therefore be decoupled from the environment, for example by elastic mounting. This can preferably be solved by elastic potting. Preferably, the transformer is encapsulated in unity with the discharge structure. By means of a replaceable high voltage assembly 2, the transformer 7 can be replaced in a simple manner. Replacing the high voltage assembly 2 thus allows the low voltage assembly 1 to continue to be used.

The arrangement of the transformer 7 in the cartridge 11 allows the high voltage assembly 1 to be compact. A simple structure is constructed. The cartridge 11 is robust against damage and interference such as dust, moisture, etc. The high voltage assembly 2 and the low voltage assembly 1 each form functional and mechanically integral subunits of the device.

The compact design of the high voltage assembly 2 in a cartridge 11 makes it possible to keep cable lengths to a minimum. The very short cables used mean that impedance can be minimized. The compact design of the high voltage assembly 2 also makes it possible to arrange the discharge structure 12 in the immediate vicinity of the piezoelectric transformer 7 and thus, under certain circumstances, to dispense completely with the connecting cables on the high voltage side.

Figure 2:
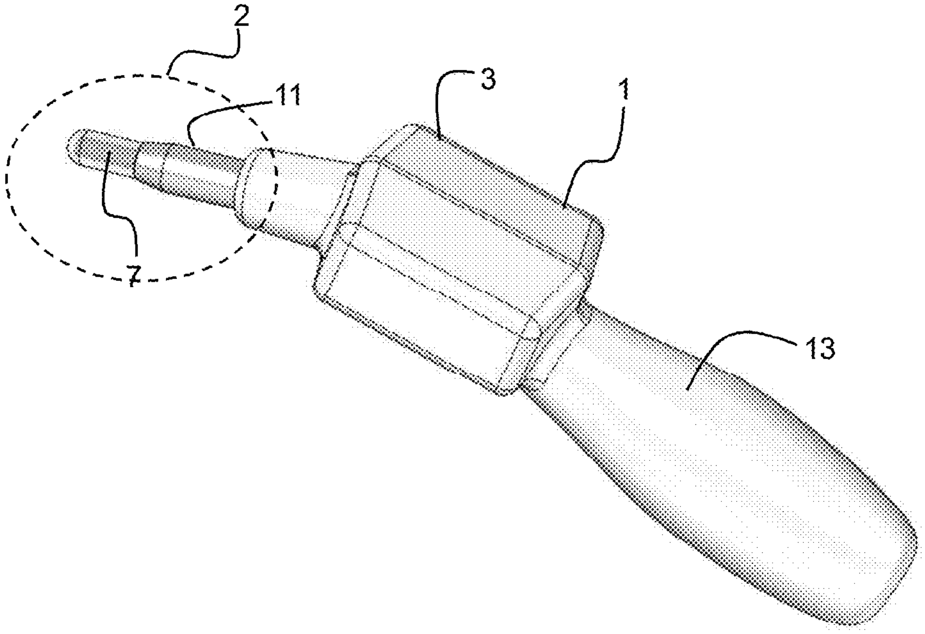
FIG. 2 shows an embodiment of the device shown schematically in FIG. 1.

FIG. 2 shows a first embodiment of the device schematically shown in FIG. 1. The embodiment example shown in FIG. 2 is a hand-held device.

The high voltage assembly 2 is designed as a cartridge 11. The piezoelectric transformer 7 is arranged in the cartridge 11. The cartridge 11 has the discharge structure 12 shown in FIG. 3. The cartridge 11 is plugged-in into the low voltage assembly 1. Thereby, the input contact 10*a*, 10*b* of the cartridge 11 is electrically connected to the output contact 8*a*, 8*b* of the low voltage assembly 1.

The low voltage assembly 1 used in the embodiment shown in FIG. 2 is a hand-held device. The handheld device includes a handle 13 by which the user can hold the handheld device when using the device. The handle 13 is arranged at the end of the device facing away from the high voltage assembly 2. A battery or rechargeable battery may be arranged in the handle 13 as a power supply. Alternatively, a connection for connection to a mains supply may be provided in the handle 13. The low voltage assembly 1 further comprises a display screen and control elements which are not shown in FIG. 3. The control elements may be buttons, for example. Alternatively or additionally, the screen may be a touch-sensitive screen through which a user may input control commands.

In FIGS. 3 to 13, various high voltage assemblies 2 are each shown schematically in a cross-sectional view. The high voltage assemblies 2 thereby differ in the respective discharge structure 12. Accordingly, each of the high voltage assemblies 2 shown in FIGS. 3 to 13 results in different gas discharges, for example different plasma discharges. Each of the high voltage assemblies 2 shown in FIGS. 3 to 14 has a piezoelectric transformer 7 as the transformer 7. Each of the high voltage assemblies 2 shown in FIGS. 3 to 13 has identical input contacts 10*a*, 10*b* connected to the output contacts of the low voltage assembly 1 through the connector 9. Accordingly, each of the high voltage assemblies 2 shown in FIGS. 3 to 13 is compatible with the same low voltage assembly 1.

Figure 3:
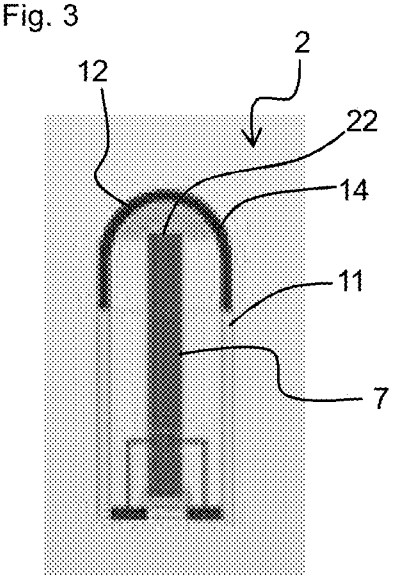
FIGS. 3 to 13 show schematically various high voltage assemblies in cross-section.

FIG. 3 shows a schematic view of a high voltage assembly 2 according to a first embodiment. The input contacts 10*a*, 10*b* and the piezoelectric transformer 7 are interconnected by short electrical leads.

The piezoelectric transformer 7 is encapsulated in the cartridge 11. Accordingly, the cartridge 11 is sealed in an airtight manner. A discharge structure 12 is attached to the envelope of the cartridge 11. The discharge structure 12 comprises a metallization 14 applied to an outer surface of the envelope. The piezoelectric transformer 7 generates a strong electric field when it generates a high voltage. The metallization 14 of the discharge structure 12 changes the field routings of this electric field. This can affect the nature of a plasma cloud generated by the device.

In the embodiment shown in FIG. 3, the discharge structure 12 extends in a semicircular shape around an output region and an output-side end face of the piezoelectric transformer 7. The discharge structure 12 shown in FIG. 3 causes a gas discharge by generating plasma using corona discharge. Corona discharges can occur in gaseous or liquid media as a result of field ionization if an electric field strength is high enough.

Figure 4:
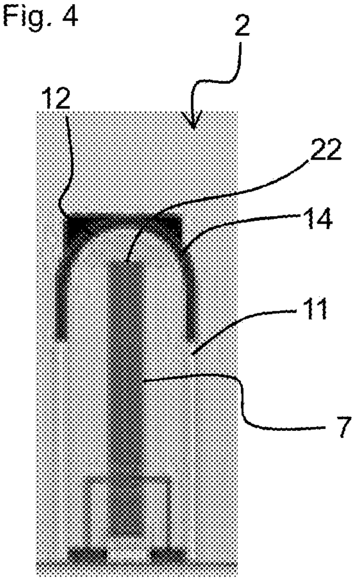
Figure 5:
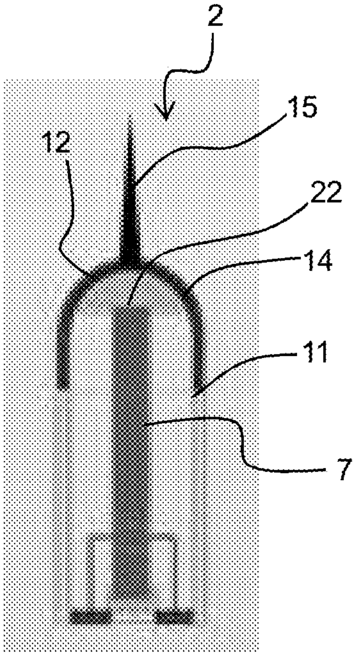
Figure 6:
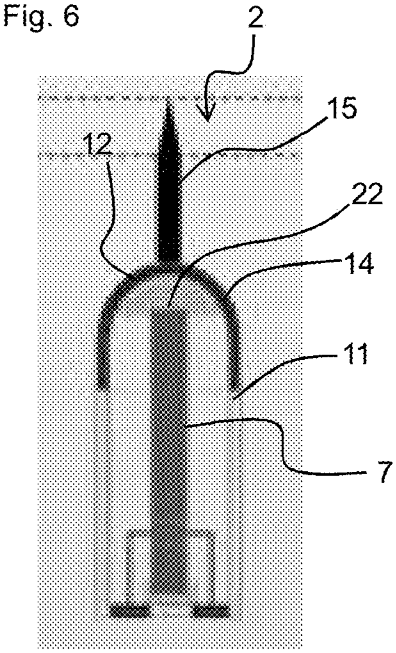

FIG. 4 shows a second high voltage assembly 2, which differs from the high voltage assembly 2 shown in FIG. 1 by having a different discharge structure 12. The discharge structure 12 shown in FIG. 4 has a metallization 14 that is flattened at the output end of the high voltage assembly 2. A different plasma cloud is generated by this discharge structure 12. The discharge structure 12 shown in FIG. 4 also causes plasma generation by means of corona discharge.

FIGS. 5, 6, 7, and 8 each show high voltage assemblies 2 in which a discharge structure 12 has a metallization 14 of the envelope of the cartridge 11. The discharge structures 12 further comprise an element 15 protruding from the cartridge 11. The protruding element 15 comprises a conductive material, such as a metal. In the structure shown in FIG. 5, the protruding element 15 is needle-shaped. In the discharge structure 12 shown in FIG. 6, the protruding element 15 is blade-shaped. In the discharge structure 12 shown in FIG. 7, the protruding element 15 has a wire 16 that extends perpendicular to a longitudinal axis of the cartridge 11. In the structure shown in FIG. 8, the protruding element 15 is brush-shaped and has bristles 17.

Figure 7:
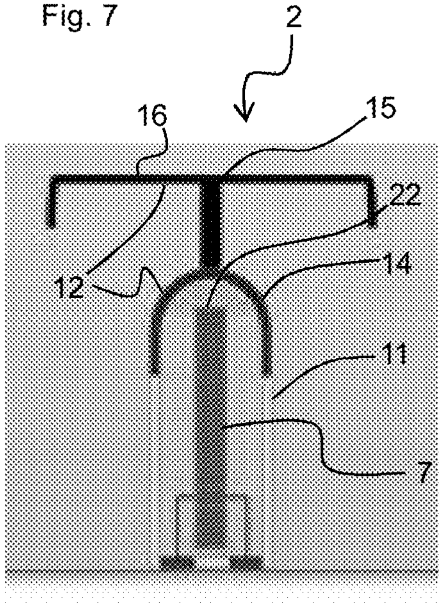

The protruding element 15 affects the field distribution of the electric field. If the protruding element 15 is tapered, as in FIGS. 5 and 6, there is a strong field elevation at the tip of the protruding element 15 and gas is discharged in a point-like manner at this location. If the protruding element 15 is elongated, as shown in FIG. 7, gas is discharged along the entire length of the protruding element 15. The discharge structures 12 shown in FIGS. 4 to 7 each effect gas discharge by plasma generation using corona discharge.

Figure 8:
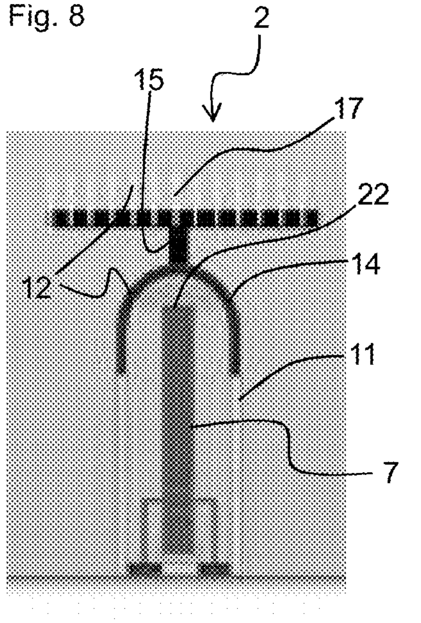

In the brush-shaped protruding element 15 shown in FIG. 8, some of the bristles 17 may be conductive and some of the bristles 17 may be non-conductive. Conductive bristles 17 may also induce a field elevation at their tip such that multiple point gas discharges, such as plasma ignitions, occur at the tips. The conductive bristles may be configured to ignite plasma by a corona discharge or by a dielectric barrier discharge. Non-conductive bristles 17 may be used to mechanically treat a surface, for example to clean the surface.

Figure 9:
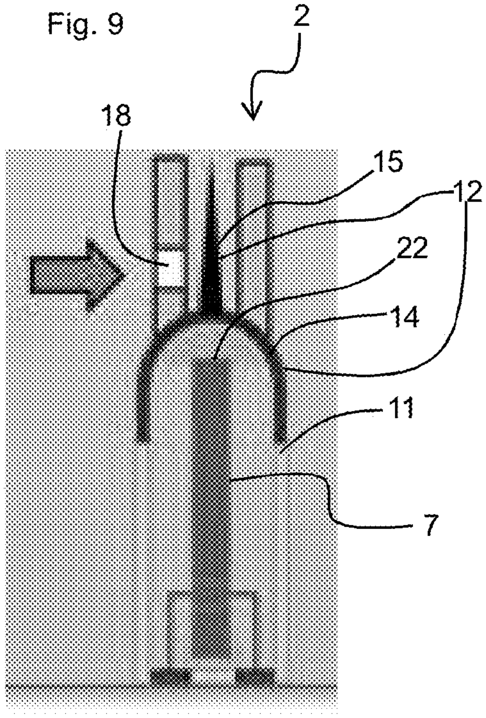

FIG. 9 shows another embodiment for a high voltage assembly 2. The embodiment shown in FIG. 9 is based on the embodiment shown in FIG. 5, wherein further a gas supply 18 for a process gas is provided in the high voltage assembly 2. The process gas is thereby fed in the area of gas discharge, for example, the area of plasma ignitions. The process gas is ionized by the gas discharge. The process gas can be, for example, air or a noble gas, e.g. argon. The process gas supply 18 shown in FIG. 9 can be provided in any of the high voltage assemblies 2 shown in FIGS. 3 to 13.

Figure 10:
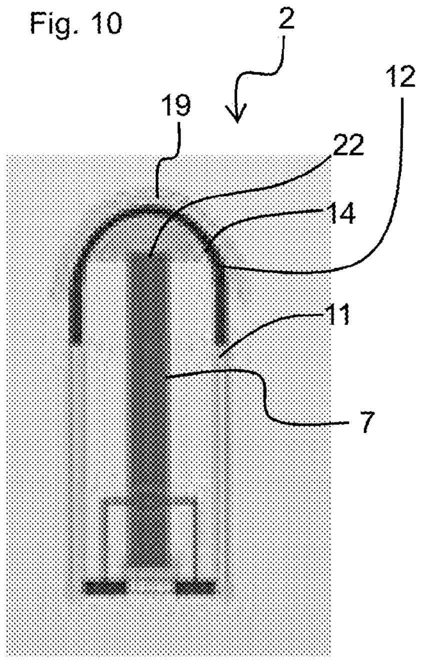
Figure 11:
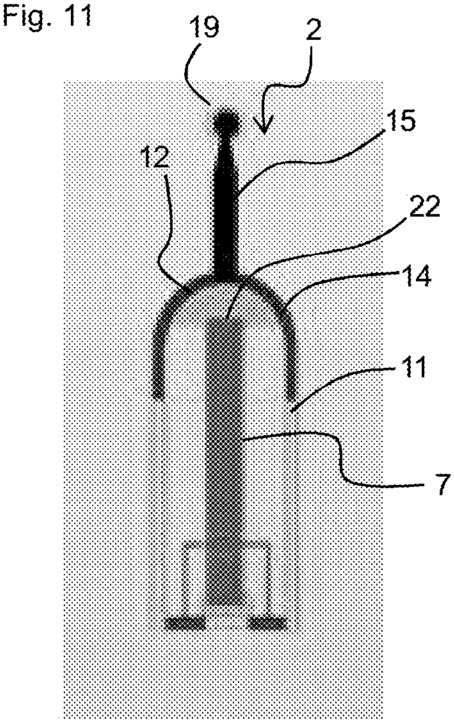
Figure 12:
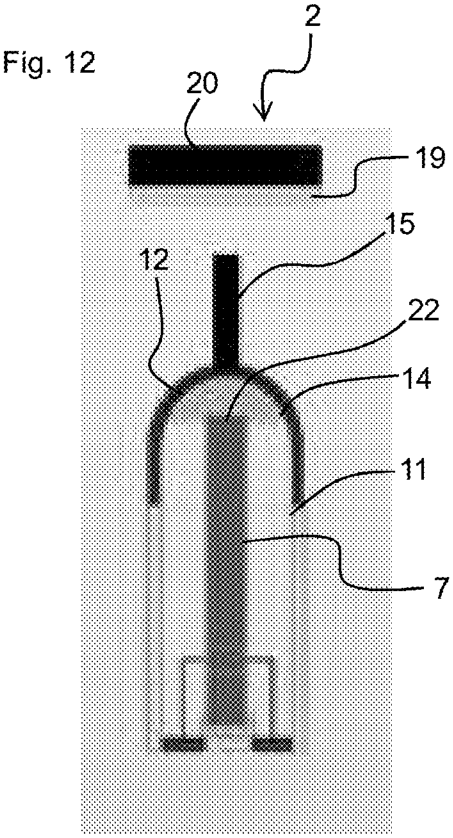

FIGS. 10, 11 and 12 each show high voltage assemblies 2 configured to generate gas discharges by plasma ignition through a dielectric barrier discharge. The dielectric barrier discharge may be an AC gas discharge in which at least one of the electrodes is isolated from the gas space by galvanic isolation using a dielectric.

In FIG. 10 and in FIG. 11, the metallization 14 of the discharge structure 12 is additionally coated by a dielectric layer 19. Plasma is ignited by a dielectric barrier discharge. In the embodiment shown in FIG. 12, a counter electrode 20 is additionally provided, which is coated with a dielectric layer 19.

Figure 13:
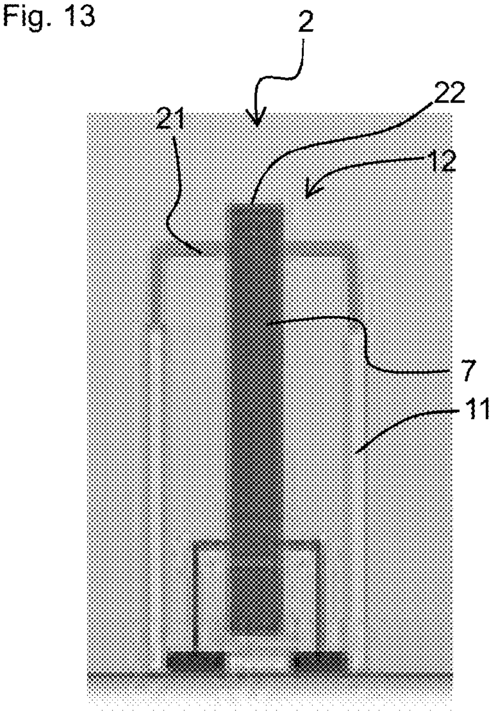

FIG. 13 shows another embodiment of a high voltage assembly 2. In the embodiment shown in FIG. 13, the piezoelectric transformer 7 is not completely encapsulated in the cartridge 11. Rather, the cartridge 1 has an opening. The piezoelectric transformer 7 is partially surrounded by an insulator 21, which, however, does not cover the output-side end face 22 of the transformer 7. The transformer 7 shown in FIG. 13 is designed to generate plasma by a corona discharge. The plasma is ignited at the output-side end face 22 of the transformer 7.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A device comprising:
- a low voltage assembly having an output contact, the low voltage assembly configured to provide a low voltage at the output contact;
- a high voltage assembly comprising an input contact and a transformer; and
- a plug-in connection interconnecting the low voltage assembly and the high voltage assembly,
- wherein the plug-in connection is configured to provide an electrical contact between the output contact of the low voltage assembly and the input contact of the high voltage assembly,
- wherein the low voltage provided at the output contact is applicable to the transformer via the input contact,
- wherein the transformer is configured to convert the low voltage into a high voltage,
- wherein the device is configured to generate a gas discharge,
- wherein the high voltage assembly comprises:
  - a cartridge in which the transformer is arranged and which comprises the input contact, and
  - a discharge structure configured to affect an electric field generated by the high voltage produced at the transformer,
  - wherein the discharge structure comprises:
    - a metallization of an outer surface of the cartridge,
    - a protruding element arranged on an outside of the cartridge, and
    - a first conductive material,
  - wherein the protruding element is needle-shaped, blade-shaped or rounded at its tip, or
  - wherein the protruding element has, at an end facing away from the transformer, a wire extending perpendicularly to a longitudinal direction of the cartridge, or
  - wherein the protruding element comprises bristles, at least some of the bristles comprising at least one of a second conductive material or a first insulating material.

2. The device according to claim 1,
- wherein the low voltage assembly comprises a housing, and
- wherein the housing and the cartridge are latched together by the plug-in connection or
- wherein the housing and the cartridge are clamped together by the plug-in connection.

3. The device according to claim 2, wherein the transformer is encapsulated in the cartridge.

4. The device according to claim 2, wherein the cartridge has an opening.

5. The device according to claim 1, wherein the discharge structure is coated with a second insulating material forming a dielectric barrier.

6. The device according to claim 1, wherein the high voltage assembly is separable from the low voltage assembly.

7. The device according to claim 1, wherein the low voltage assembly comprises a driver configured to drive the transformer.

8. The device according to claim 1, wherein the transformer is a piezoelectric transformer.

9. The device according to claim 1, wherein the high voltage assembly comprises a gas supply through which a process gas is suppliable.

10. The device according to claim 1, wherein the device is at least one of a plasma generator, an ionizer, an ozone generator or a gas discharge structure.

11. The device according to claim 1,
- wherein the low voltage assembly comprises two output contacts,
- wherein the high voltage assembly comprises two input contacts, and
- wherein the plug-in connection is configured to plug the high voltage assembly into the low voltage assembly in both orientations such that each of the output contacts is connectable to either of the two input contacts.

12. An arrangement comprising:
- the device according to claim 1; and
- a further high voltage assembly,
- wherein the low voltage assembly of the device is adapted to be interchangeably connected to one of the high voltage assembly of the device or the further high voltage assembly.

13. A device comprising:
- a low voltage assembly having two output contacts, the low voltage assembly configured to provide a low voltage at the output contact;
- a high voltage assembly comprising two input contacts and a transformer; and
- a plug-in connection interconnecting the low voltage assembly and the high voltage assembly,
- wherein the plug-in connection is configured to:
  - provide an electrical contact between the output contact of the low voltage assembly and the input contact of the high voltage assembly, and
  - plug the high voltage assembly into the low voltage assembly in both orientations such that each of the output contacts is connectable to either of the two input contacts,
- wherein the low voltage provided at the output contacts is applicable to the transformer via the input contacts,
- wherein the transformer is configured to convert the low voltage into a high voltage, and
- wherein the device is configured to generate a gas discharge.

14. The device according to claim 13, wherein the high voltage assembly comprises a cartridge in which the transformer is arranged and which comprises the input contacts.

15. The device according to claim 14, wherein the low voltage assembly comprises a housing, and
- wherein the housing and the cartridge are latched together by the plug-in connection.

16. The device according to claim 14,
- wherein the low voltage assembly comprises a housing, and
- wherein the housing and the cartridge are clamped together by the plug-in connection.

17. The device according to claim 14, wherein the transformer is encapsulated in the cartridge.

18. The device according to claim 14, wherein the cartridge has an opening.

19. The device according to claim 13, wherein the high voltage assembly comprises a discharge structure configured to affect an electric field generated by the high voltage produced at the transformer, and wherein the discharge structure is coated with an insulating material forming a dielectric barrier.

* * * * *